Sept. 16, 1969     O. F. RUIZ     3,467,030
DOUGH DIRECTING FUNNEL
Filed Oct. 21, 1966
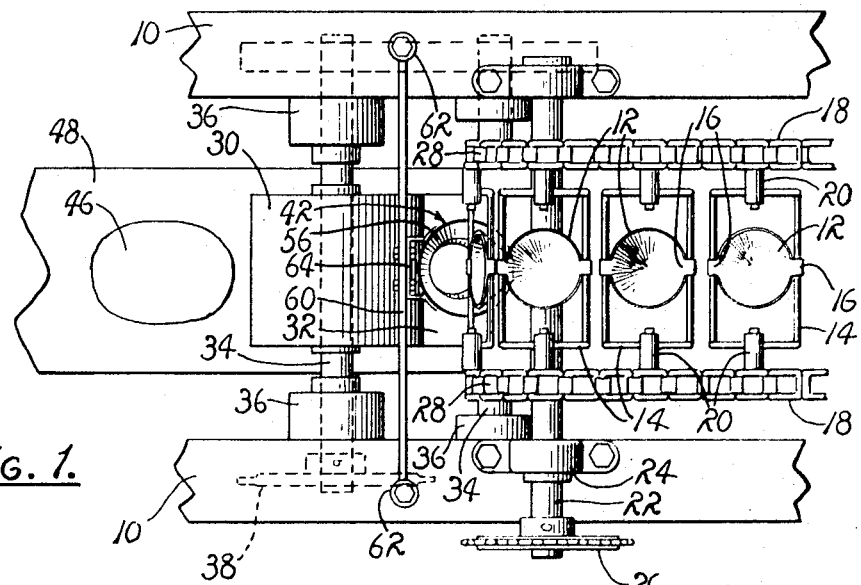
FIG. 1.
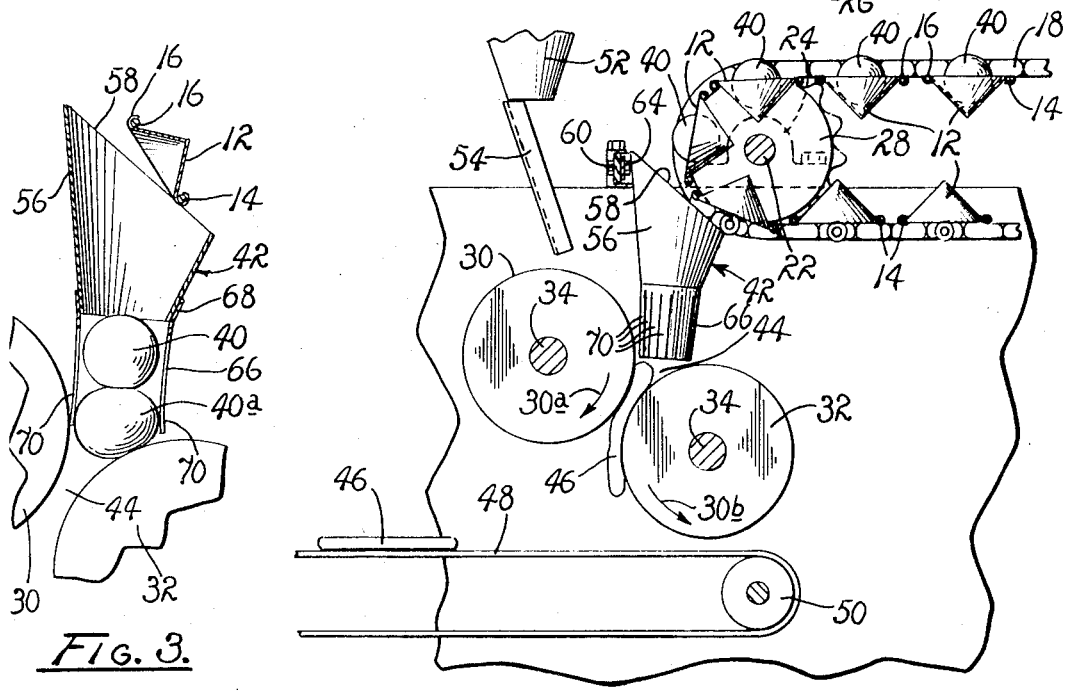
FIG. 3.
FIG. 2.
OSCAR F. RUIZ
INVENTOR
Huebner + Worrel
ATTORNEYS

United States Patent Office 3,467,030
Patented Sept. 16, 1969

3,467,030
DOUGH DIRECTING FUNNEL
Oscar F. Ruiz, P.O. Box 1253, Tulare, Calif. 93274
Filed Oct. 21, 1966, Ser. No. 588,348
Int. Cl. A21c *3/04, 3/00*
U.S. Cl. 107—9      3 Claims

ABSTRACT OF THE DISCLOSURE

In an apparatus for forming a thin cake from a ball of dough, a funnel for receiving balls of dough and directing them to the nip area of a pair of coacting rollers, the funnel having a plurality of flexible fingers terminating in the nip area and defining a tubular discharge conduit having a substantially uniform cross section throughout its length, the fingers being displaceable for varying the cross section of the conduit but urged into conduit defining relationship for the discharge of balls of dough sequentially therefrom.

---

The present invention relates generally to dough forming machines, and more particularly to a dough directing funnel.

Field of invention

The device of the present invention was developed as a solution to certain problems encountered in automated tortilla production and is conveniently described in connection therewith although in no sense restricted to such operational environment. It is well known that tortillas are thin, flat cakes of wheat or corn flour, which in many instances heretofore have been at least partly formed from dough by hand operations for shaping and the like.

More recently there have been successful attempts to automate the production of tortillas in order to overcome unsanitary aspects of hand shaping, and to solve practical and economic problems involved, particularly where the production contemplated is of a commercial volume.

In my previous U.S. Patent No. 2,907,286, dated Oct. 6, 1959, there was disclosed apparatus adapted for automatic production of tortillas which has proved highly satisfactory in the tortilla industry.

There have been, however, certain drawbacks in prior known equipment, such as that disclosed in my prior aforementioned patent, especially where the dough used in formation of the tortillas has substantial moisture or stickiness such as when using a moist corn dough.

It is a primary object of the present invention to provide, in a tortilla forming machine, a dough directing device which tends to obviate problems involved in using sticky or moist doughs, and principally when introducing preformed balls of substantially spherical configuration to a set of primary sheeting rolls for initial flattening and formation of a tortilla patty.

One of the principal problems heretofore encountered in such an operation was the jamming or "stick-up," where two or more preformed dough balls were inadvertently fed together into a dough directing funnel, and caused a jamming of said funnel with a consequent necessitated interruption of the entire automated production. Such a jamming required a shutdown of the production line in order to clean out the jammed-up dough. This problem is accentuated when using a moist and sticky dough such as corn flour and it is not unusual to incur down-time of from ten to twenty-five percent of the operating time.

The present invention teaches a mechanism which to a substantial extent overcomes the jamming problem heretofore encountered, and more specifically when two or more preformed dough balls are presented from a dough ball conveying mechanism tends to overcome the jamming-up problem, and presents the surplusage of dough balls to the sheeting rolls for primary flattening and formation, and a combined double tortilla shell formed thereby can be subsequently culled from the machine without the necessity of stoppage of the entire apparatus for a cleaning-out operation.

The function of the present apparatus is attained primarily by use of a dough ball receiving and directing funnel of a particular construction and configuration adapted to receive dough balls, preferably singly, but capable of accepting a plurality of the balls, and effectively transmitting them to the sheeting rolls without jamming.

Additional objects and advantages of the present invention will be readily apparent from the following detailed description of an embodiment thereof when taken together with the accompanying drawing in which:

FIG. 1 is a fragmentary plan view of a portion of a tortilla forming machine embodying the features of the present invention.

FIG. 2 is a side elevational view, partly in section, of the apparatus of FIG. 1.

FIG. 3 is a fragmentary enlarged view, partly in section, of a primary portion of the present invention depicting a dough ball directing funnel mechanism.

Referring in greater detail to the drawing, much of the mechanism shown therein being old in the art, there is provided, as is common in presently used machines, frame members 10 comprising portions of longitudinally extending machine construction. Dough ball carrying cups 12 of a generally conical configuration are carried by and supported on rectangularly shaped supports 14, and affixed thereto by means of tabs 16 or the like. The supports 14 are secured to spaced parallel conveyor chains 18 at each side of the apparatus by means of trunnions 20 or the like, and are rotationally secured with respect to the conveyor chains.

As shown in the drawing, a drive mechanism for the conveyor chains includes a shaft 22, rotatably mounted in bearing blocks 24 at each end thereof. One end of the shaft has a sprocket wheel 26 secured thereto adapted for coaction with drive means for the apparatus, the conveyor chains passing around a pair of sprocket wheels 28 on the shaft. In operation each of the dough ball cups 12 is adapted to receive, from another portion of the apparatus, not shown, a single dough ball, whether of wheat or corn flour, and during its course or path of travel separately and sequentially to discharge or deposit the dough ball into and between the nip of the sheeting rolls, for at least a preliminary flattening and forming therebetween. Since the cups are rotationally fixed with respect to the chains 18 they pass around the sprocket wheels 28 provided at the discharge end of the conveyor and invert from an upright position into discharge position for the individual dough balls.

The sheeting rolls are indicated at 30 and 32, and are rotatably mounted by shafts 34 rotatably carried by journal bearings 36, and adapted for being driven from the main drive mechanism of the machine through sprocket wheel 38 or the like. It is not necessary that the drive of these rolls be directly correlated with the conveyor drive means for the dough ball cups, but a desired rotational speed relationship of the rolls should be set up with respect to the discharge therebetween of the balls of dough.

Dough balls carried by the dough ball cups 12 are shown at 40, and during the course of operation of the machine, having been previously introduced individually into the cups, are discharged into a dough ball directing funnel generally designated 42. The individual, and or multiplicity of dough balls, are thence discharged into the active or nip area 44 of the rolls 30 and 32 wherein the dough ball is initially flattened as shown at 46. The flattened dough is thereafter discharged onto a continuous belt conveyor 48 for conveyance to a subsequent station for further operation in the ultimate formation of the tortillas, such as a secondary rolling and/or a prebaking or baking station. The conveyor 48 is operatively mounted by means of rollers as at 50 in a usual known manner. The directions of rotation of the rolls 30 and 32 are shown respectively by means of arrows 30a and 30b.

When utilizing a moist or sticky dough it is desirable to utilize a dusting flour on the sheeting rolls. Such means, which are well known in the art, may consist of a bin or trough 52 for containing a supply of dusting flour which is dischargeable down a chute 54, adapted to direct the flour upon the outer periphery of roll 30, which additionally tends to deposit a portion thereof on the outer periphery of roll 32.

The essence of the present invention resides in the structure and positioning of the funnel 42 which serves the purpose of directioning the dough balls to a central position with respect to the sheeting rolls and subsequent conveyor, in addition to preventing a jamming-up of the machine in the event that a plurality of the dough balls are fed toward the sheeting rolls at the same time. The funnel 42 has an upper truncated conical configuration 56, with a sloped upper entrance end 58 positioned in proximity to the discharge position of the individual dough ball carrying cups 12, as more clearly shown in FIG. 2 of the drawing. Support means for the funnel 42 consists in a transversely positioned bar 60, secured at its ends 62 to the frame members 10 by means of bolts or the like. The funnel is supported and attached to the bar 60 by means of a bracket 64, operatively connected between the bar 60 and the body of the upper funnel portion 56.

The lower portion of the funnel 42 includes a friction reducing chute 66, preferably formed of a material having a low friction factor and low material adherent characteristics such as for example polytetrafluoroethylene, commercially sold under the trade name of Teflon. Manifestly other materials of a similar nature can be utilized and/or the material of the chute can be coated with a material of this nature. In the embodiment shown in the drawing, this chute 66 is attached at its upper end 68 to the lower discharge end of the conical portion 56 of the chute, and consists of a plurality of individual resilient fingers 70 formed by a longitudinal slitting of the material constituting the chute. This resiliency, in conjunction with the reduced friction of the material used by the chute, facilitates passage of dough balls through the chute, and if more than one dough ball has been deposited in the funnel at a given time, such as shown in FIG. 3 for example, the possibility of the multiplicity of dough balls passing through the funnel and chute into the nip between the rolls is greatly enhanced. As shown in FIG. 3, there is a tendency for the lowermost dough ball 40a, when more than one dough ball is simultaneously introduced with another one, to be flattened out upon contact with the roll 32 which, tending to spread the dough ball, tends to jam the machine. It has been found however that the coaction of the resilient fingers and the friction reducing material substantially overcomes a hanging-up or jamming of the machine when this occurs, and on the other hand the two or multiplicity of dough balls tends to pass into the nip of the roll and be flattened by the rolls, resulting in an oversized tortilla and this enlarged tortilla can be later removed or culled from the line deposited on conveyor 48.

Having described my invention, what I claim as new and desire to secure by Letters Patent is:

1. In apparatus for forming a thin cake from a ball of dough which includes coacting spaced rollers through which a ball of dough is adapted to pass for flattening, and conveyor means for balls of dough adapted successively to discharge separate balls of dough between the rollers at a discharge position; a dough ball directing funnel in proximity to the discharge position of said ball conveyor means and having an outlet with a discharge end in a nip area between the rollers for delivering balls of dough directly thereto, said outlet being adapted to maintain the balls of dough in successive relation to prevent jamming of dough balls passing from said conveyor to said rollers, said funnel outlet comprising a longitudinally slitted tube, said tube including a material forming an inner wall thereof of friction reducing and low material adherent characteristics.

2. An apparatus as claimed in claim 1 in which said slitted tube forms a plurality of flexible fingers extending downwardly therefrom.

3. In apparatus as claimed in claim 2, said tube and said fingers consisting of polytetrafluoroethylene.

References Cited

UNITED STATES PATENTS

| | | | |
|---|---|---|---|
| 1,201,963 | 10/1916 | Hill | 221—310 XR |
| 1,871,753 | 8/1932 | Smith | 107—12 |
| 2,077,896 | 4/1937 | Quick | 107—12 XR |
| 2,982,045 | 5/1961 | Highland | 141—337 XR |
| 3,086,455 | 4/1963 | Belk | 100—213 XR |
| 3,315,842 | 4/1967 | McGurk | 221—310 |
| 3,354,843 | 11/1967 | Valazquez et al. | 107—9 |

ROBERT W. MICHELL, Primary Examiner

A. O. HENDERSON, Assistant Examiner

U.S. Cl. X.R.

141—337; 193—25